(12) United States Patent
Tien

(10) Patent No.: US 8,125,452 B2  
(45) Date of Patent: Feb. 28, 2012

(54) ELECTRONIC BOOK COVER

(76) Inventor: Kuang-Hsia Tien, Monrovia, CA (US)

( * ) Notice: Subject to any disclaimer, the term of this patent is extended or adjusted under 35 U.S.C. 154(b) by 352 days.

(21) Appl. No.: 12/550,791

(22) Filed: Aug. 31, 2009

(65) Prior Publication Data

US 2009/0317210 A1  Dec. 24, 2009

Related U.S. Application Data

(62) Division of application No. 11/541,758, filed on Sep. 30, 2006, now abandoned.

(51) Int. Cl.
*G09G 5/00* (2006.01)
*G06F 3/02* (2006.01)

(52) U.S. Cl. .......... 345/169; 281/15.1; 206/472

(58) Field of Classification Search .......... 345/87, 345/204, 168, 169; 281/15.1–50; 402/1, 402/3, 4; 708/100, 105–112; 206/472–475; 434/317
See application file for complete search history.

(56) References Cited

U.S. PATENT DOCUMENTS

| | | | |
|---|---|---|---|
| 4,096,577 A * | 6/1978 | Ferber et al. ........... 708/190 |
| D290,375 S | 6/1987 | Nava | |
| D291,209 S | 8/1987 | Nava | |
| 5,209,592 A | 5/1993 | Bedol | |
| D350,971 S | 9/1994 | Lassberg | |
| 5,534,888 A * | 7/1996 | Lebby et al. ........... 345/672 |
| 6,257,622 B1 * | 7/2001 | Peker ........... 281/29 |
| 6,525,706 B1 * | 2/2003 | Rehkemper et al. ........ 345/87 |
| 7,448,650 B2 * | 11/2008 | Hengsbach ........... 281/29 |
| 2003/0117375 A1 * | 6/2003 | Suda ........... 345/169 |
| 2005/0269815 A1 * | 12/2005 | Silverman ........... 281/29 |

* cited by examiner

*Primary Examiner* — Stephen Sherman
(74) *Attorney, Agent, or Firm* — Clement Cheng

(57) ABSTRACT

The electronic book cover is of a thick board adapted to support an electronic device, such as a calculator or MP3 player. A cutout in the board receives the electronic device, and it is securely bolstered to the main block of book pages. The board is completely covered by an elastic skin, except in an opening where the device displays visual information. The cover also includes a keypad, labeled with various characters and symbols, which can be pressed to initiate the processing of preprogrammed functions by the electronic device. A layered switch circuit lies underneath the soft keypad and is comprised of two distinct layers: the first dielectric film layer has rows and columns of checkered conductive sections facing inward towards the book cover, and the second dielectric film layer has a pattern of disconnected electric contacts at locations facing the conductive sections and is superimposed in the keypad.

14 Claims, 3 Drawing Sheets

ELECTRONIC BOOK COVER

This application is a divisional of U.S. Ser. No. 11/541,758 entitled Electronic Book Cover by same inventor Tien, Kuang-Hsia's filed Sep. 30, 2006 now abandoned which claims priority from Calculator Notebook by same inventor Tien, Kuang-Hsia having United States design patent Ser. No. 29/263,129 filed Jul. 17, 2006.

BACKGROUND OF THE INVENTION

A. Field of the Invention

The present invention relates to the bookbinding field; it is a book cover with an electronic device embedded within it, such as a calculator.

B. Description of the Prior Art

Bookbinding functions to secure individual leaflets of paper, valuable writings, and/or drawings together, allowing for the extended preservation of such materials. Binding is also used to create presentations and organize valuable documents. Fast-setting glues and binding spines are utilized to create copies of books, blank journals, notebooks, and various types of personal planners.

Electronic media was subsequently invented to enhance to convenience of these items. Personal digital assistant (PDA) devices can selectively store and view information through a user interface, which often includes a display device and keypad for input. Electronic calculators and organizers are classified as primitive forms of personal electronic devices because of their ability to process numerical calculations and store retrievable personal data. The accessibility and affordability of such devices greatly contributes to the universal nature of modern electronics. Calculators can now be manufactured on a single IC chip and are thus frequently integrated into common devices such as cellular phones. The embedded calculators can take advantage of the existing keypad and display interfaces on the cellular phone. The improved integration of additional memory devices and processors allows for the realization of various functions in thinner form factor within the electronic environment.

An attempt to integrate traditional and current portable devices was made in U.S. Pat. No. 4,096,577, which outlines a simple checkbook with a calculator on its upper flap. More recently, a planner notebook was marketed to include a thin, clip-shaped calculator accessory. These devices, along with similarly designed products, use thin electronic devices in order to take up minimal space around the books or journals. However, it is important to note that the electronic devices are nothing more than additional attachments to the original product.

There is currently a demand for an appropriate way to combine a bookbinding and electronic device in a method wherein productive synergy is created, benefiting the overall functionality of the compact handheld device.

The present invention, in its most fundamental form, provides a book cover with a universal calculator embedded within the binding. The use of bookbinding ensures that the electronic device maintains its adherence to the book, and the two cannot be separated under any circumstance. The basic principle of present invention can be also applied to other modern compact media devices, such as mini MP3 players. It simply provides a seamless convergence of analog printed matter and digital multimedia so that the user can experience both physical and virtual functions of the device. Furthermore, the previously discussed book cover allows a user to experience the digital creations of others while simultaneously producing his own work on the same journal.

According to the present invention, an electronic device with active and passive components (such as IC chips, processors, capacitors, switches and LCD displays) and an interactive keypad surface are added to the traditional bookbinding process. Thus, it is an object of the present invention to provide a book cover and an electronic device which are united by a binding component, creating a book with added entertainment or creative functionality.

SUMMARY OF THE INVENTION

The electronic book cover, according to the present invention, uses the same traditional process for bookbinding, but the finished product serves as both an interactive novelty and a conventional book cover.

This improved cover for bookbinding is comprised of three main components. The first is a supportive board used for binding a book with multiple pages; comprised of a face, back, four side edges and at least one void where the an active electronic device is installed. The electronic device has a rigid mount, which is fixed onto the void so that the visible display can be read through the void. The second component is an elastic skin that covers the entire face and board except for the void. The skin includes a keypad marked with various characters and symbols which can be pressed to initiate the processing of preprogrammed functions by the electronic device. The third component is a switch circuit with two distinct layers: the first dielectric film layer has rows and columns of checkered conductive sections facing inward towards the book cover, and the second dielectric film layer has a pattern of disconnected electric contacts at locations facing the conductive sections and is superimposed in the keypad. A perforated planar spacer separates the two dielectric film layers until a person presses the keypad, which makes an electrical contact between the second film and the first film. The second dielectric film has a circuit pattern of electric bus that communicates with the electric contacts by conductive throughholes. The fourth component is a bottom sheet, approximately the same size of the board, which covers the back of the board and elastic skin folds.

The electronic device holds a processing chip, printed circuit board, and battery (replaceable and/or solar) on the rigid mount. The supportive board and bottom sheet may be comprised of cardboard materials of different thicknesses, and the elastic skin may be an opaque rubber sheet. The numerical characters and symbols on the keypad may be engraved, embossed or printed on the elastic skin. The dielectric films may be made of semi-rigid plastic sheets; each printed with conductive ink that provides circuit paths and contacts. The perforated planar spacer may be made of a sheet of sponge material with cutouts at perforations.

In addition to a calculator, the electronic device may also include a digital clock and calendar function. If the keypad is modified into "QWERTY" style, the electronic device serves as a media player that records and reproduces audiovisual information.

The embodiments of the invention will now be exemplified with reference to accompanying drawings.

BRIEF DESCRIPTION OF THE DRAWINGS

Similar reference numbers denote corresponding features throughout the attached drawings.

| | |
|---|---|
| 1: | Book |
| 10: | Book Cover |
| 12: | Book Block |
| 14: | Slit |
| 18: | Binding Spine |
| 20: | Soft skin |
| 22: | Opening |
| 24: | Electronics Housing |
| 26: | Display Window |
| 28: | Calculator |
| 29: | Character/Symbol |
| 30: | Keypad Area |
| 32: | Switch Circuit |
| 34: | First Layer |
| 36: | Checker |
| 38: | Second Layer |
| 40: | Comb Contact |
| 42: | Spacer |
| 44: | Perforations |
| 46: | Bus |
| 48: | Conductive Hole |
| 50: | Electronic Unit |
| 52: | Connection Area |
| 54: | Processor |
| 55: | PCB |
| 56: | Battery |
| 58: | Wire |
| 60: | Solar Battery |
| 62: | Printed Circuit |
| 64: | Ribbon Cable |
| 65: | Display |
| 66: | Cardboard |
| 68: | Thru-hole |
| 70: | Post |
| 72: | Plate Member |
| 74: | Screw Hole |
| 76: | Opening |
| 82: | Bottom Sheet |
| 100: | Back Cover |
| 102: | Binding Spine |
| 104: | Turned Edge |

DETAILED DESCRIPTION OF THE PREFERRED EMBODIMENT

For illustrative purposes, the invention will be described in the form of an electronic calculator, although it may be adapted to include clocks, calendars, LED signs, flash memory-based audio/video players, digital photo frames, and many other electronic commodities.

Figure 1:
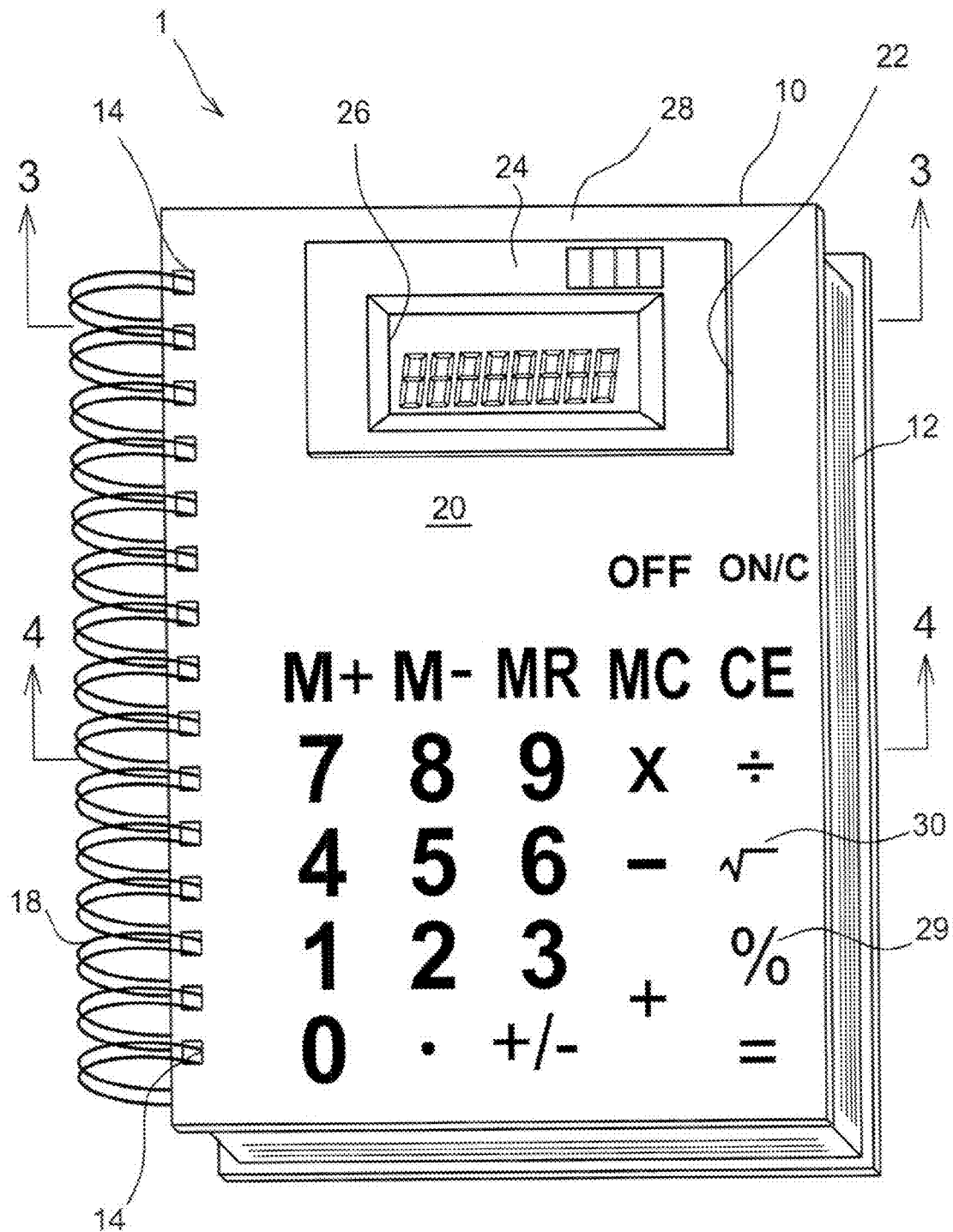
FIG. 1 is a perspective view of an electronic book cover according to the present invention.

With reference to FIG. 1, an electronic book cover 10 of the present invention is made of thick cardboard and bound to a block 12 of individual sheets. A vertical line of punched holes or slits 14 near the bound edge 16 is coupled with a metal binding spine 18 that threads the slits 14, thus holding the sheets 12 together. This "comb-bound" type of notebook increased in popularity due to the advent of desktop publishing at home offices and has proven to be a relatively simple method of binding a book.

The traditional, more rigid method of binding a book cover 10 involves a book block divided by a number of signatures threaded by yarn, wire or cable. The spine is flexibly connected to the book covers and stitched to the book block. In addition, glue is used to bolster the bond between the parts of the book. The implementation of this method is solely a matter of aesthetic taste.

A soft skin 20 forms the exterior of the cover 10 except for a large opening 22, though which a housing 24 for electronics is received. The housing 24 has a display window 26 for showing information such as the numerical result of a calculator 28, and also doubles as the book cover 10. The soft skin 20 may be made of a vinyl, leather or another like material, and it is marked with letters, numbers, and symbols 29. The characters are engraved and/or printed on the face 20 so that a large membrane keypad area 30 is formed adjacent to the display window 26.

Figure 2:
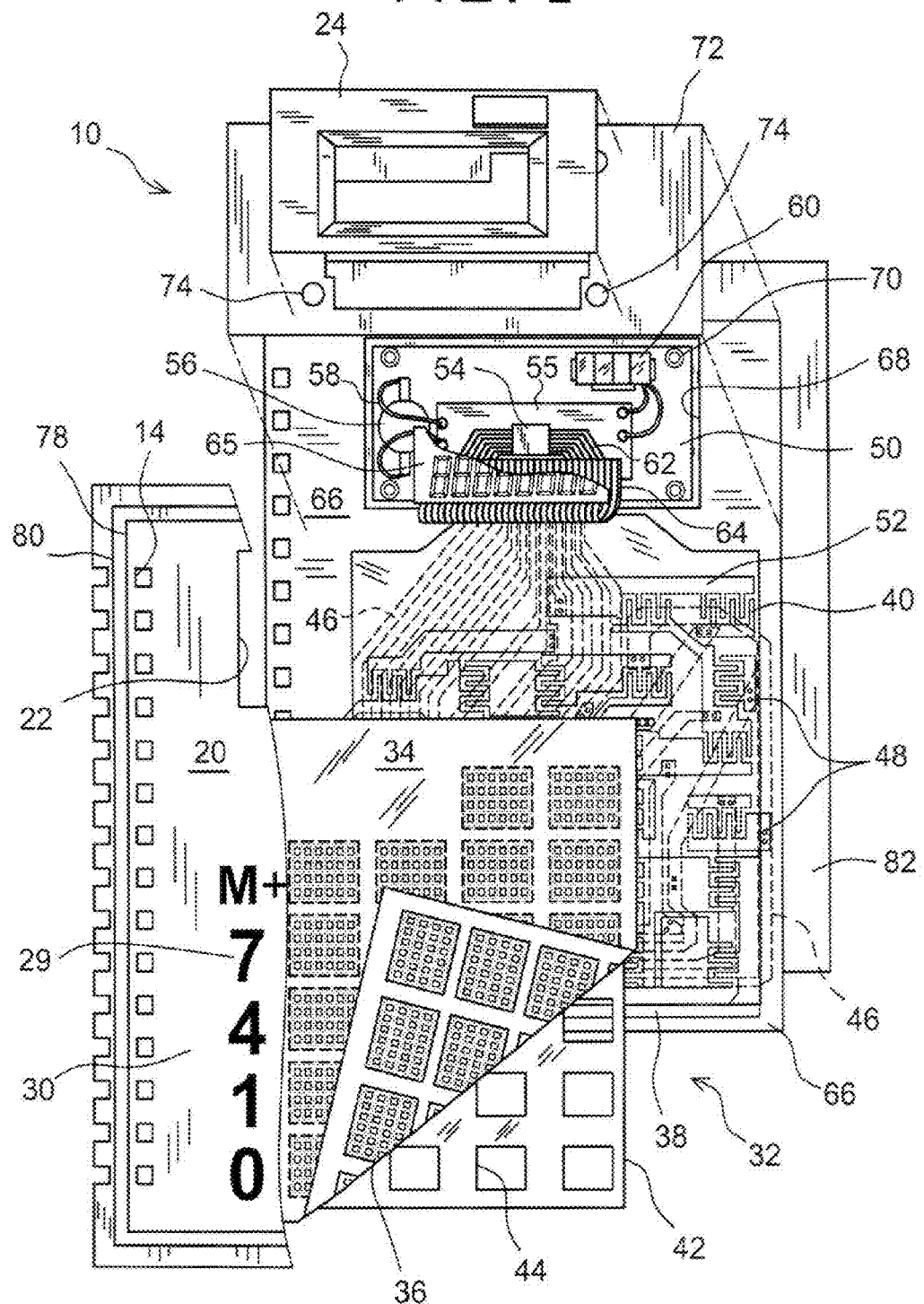
FIG. 2 is an exploded view of the book cover of FIG. 1.

In FIG. 2, the components of the book cover calculator 28 are described in further detail. Under the area of the keypad 30, there is a thin multilayer switch circuit 32. The thin multilayer switch circuit 32 is flexible and comprised of a first dielectric layer 34 with a local conductive cheker 36 positioned underneath and a second dielectric layer 38 characterized by a double-sided conductive pattern. Facing opposite the first layer 34 at its checker 36, the second layer 38 has multiple conductive comb patterns 40. The combs 40 are aligned with corresponding characters/symbols 29. Each comb 40 is made of two staggered rows of teeth, which remain separated until a contact occurs between an island of checker 36 that is positioned directly above the same teeth set.

A planar spacer 42 with rectangular perforations 44 is attached to both the underside of first layer 34 and the opposing surface of second layer 38. This setup yields two distinctive on-off switch positions, which lie between first conductive checker 36 and second conductive combs 40. An economical choice for the material of the planar spacer 42 is a sheet of sponge with mutiple cut-outs.

On the opposing side of the second dielectric layer 38 lies a multiple circuit bus 46, which is depicted by dotted lines that lead the switching comb contacts 40 to an electronic unit 50. Typically, the dielectric characteristic of the layer 38 bars its opposing conductive patterns from contact, but the strategic placement of multiple conductive holes 48 electrically communicate the opposite patterns. Depending on the circuit pattern for specific electronic functions, a section of circuit bus 46 may be connected by multiple comb contacts 40 that share a connection area 52.

Bus 46 connects to an electronic processor 54, which serves to decipher the numbers and operators inputted by the user via the keypad area 30. Processor 54 is connected to a printed circuit board (PCB) 55 and powered by a battery 56 through wires 58. The battery 56 is accesible through a slide-open door (not shown) installed in electronic unit 50 for ease of replacement. An auxiliary solar battery 60 may also be connected to the processor 54 to extend the life of the battery 56. A printed circuit 62 on PCB 55 is connected to a ribbon cable 64, which is then connected to a display 65 for showing the user inputs at keypad 30 and the calculation results of the processor 54.

The switch circuit assembly 32 and electronic unit 50 are bonded locally to a rectangular cardboard 66 with a large rectangular thru-hole 68 for receiving the electronic unit 50 next to the switch circuit 32. Unit 50 can be made on a plastic substrate for supporting the processor 54 and batteries 56, 60, and it typically has four corner screw posts 70. Unit 50 is attached to cardboard 66 by a plate member 72 with four screw holes 74 that are aligned with the screw posts 70 of unit 50; a middle opening 76 exposes the display 65. Plate member 72 can be made about the thickness of paper and glued to the inner surface of cardboard 66.

On top of the switch circuit 32 and electronic unit 50, a soft skin 20 is laid to extend slightly over the side edges of cardboard 66 so that the overhang may be folded at two rectangular lines 78, 79 around the cardboard edges. A bottom sheet 82 that is the same size of the cardboard 66 is glued to the bottom of the cardboard 66, and thus covering the folded edges of soft skin 20.

Figure 3:
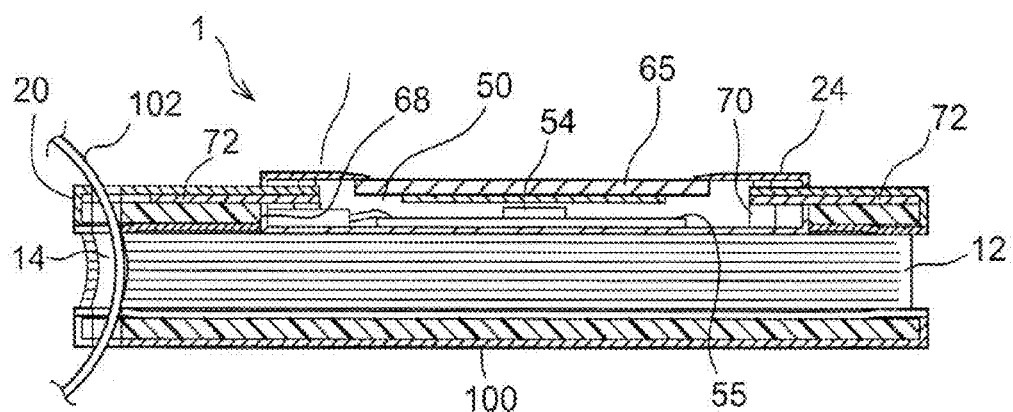
FIG. 3 is a cross sectional view of the book cover taken along line 3-3 of FIG. 1 showing the interior of the calculator in relation to other book components.

FIG. 3 clearly shows in cross section the positional relations of electronic components of unit 50 in book cover 10, which is bound to book block 12 complete with an opposite book cover 100.

A spiral binding spine 102 (partially shown) threads the entire book 1 at the aligned slits 14 in order to tie the book 1 together. The electronic unit 50 rests in hole 68 of book cover 10 as the housing 24 is fastened with a screw onto unit 50. Plate member 72 is thus clipped permanently in place.

Figure 4:
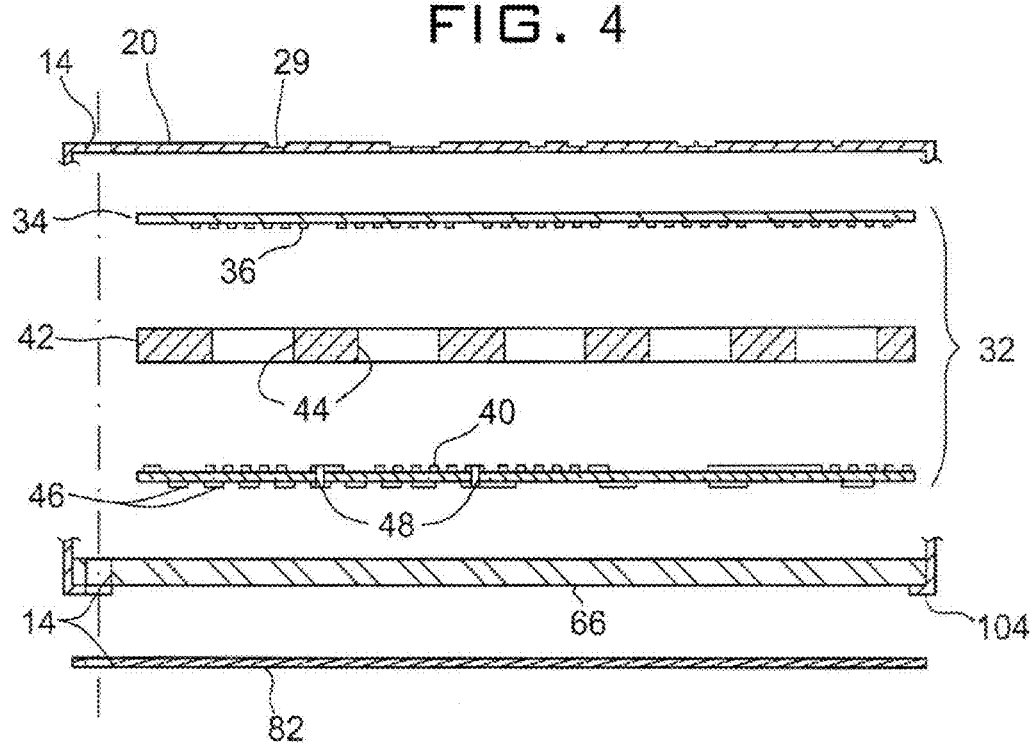
FIG. 4 is an exploded cross sectional view taken along line 4-4 of FIG. 1 to show the individual layers to make up the switch circuit in the book cover.

In FIG. 4, book cover 10 is shown in an expanded cross section perspective. This shows the connection between switch circuit 32 and electronic unit 50, which includes first layer 34 and second layer 38. The two layers are normally electrically isolated by the interposed spacer 42, but a person can intimate contact between the layers 34, 38 by pressing the soft key face 20 and one of the perforations 44. This creates a key signal.

The key signal is transmitted by the conductive holes 48 to the bus 46, which leads to the electronic unit 50. The entire book cover 10 is structurally supported by cardboard 66, over which a soft skin 20 extends to form turned edges 104. Bottom sheet 82 is bonded to edges 104, and the bottom of cardboard 66 completes book cover 10.

The electronic book cover is the presently preferred embodiment of the invention, and it has been shown and described with several modifications thereof discussed. Persons skilled in this art will readily appreciate that various additional changes and modifications may be made without departing from the spirit of the invention, as defined and differentiated by the following claims.

The invention claimed is:

1. An electronic book cover comprising:
   a board for use in binding a hook block having a plurality of writing sheets, the board having a face, a back, four side edges and at least one void to accommodate an active electronic device installed therein:
   the electronic device including a rigid mount fixed onto the board about the void and having a visible display through the void;
   an elastic skin for covering the face and a part of the board except the void, the skin having a keypad of key areas marked with various characters and symbols to be typed into the electronic device for processing preprogrammed functions; and
   a layered switch circuit mounted between the elastic skin and board,
   wherein the layered switch circuit has a first dielectric film with rows and columns of checkered conductive sections facing inwardly of the book cover, a second dielectric film has a pattern of disconnected electric contacts at locations facing the conductive sections and superimposing the key areas, and a perforated planar spacer for normally isolating the first and second dielectric films but yielding to typing depressions for locally making electrical contacts at the second film by the first film and the second dielectric film also having at its opposite face a circuit pattern of electric bus communicating with the electric contacts by conductive through-holes; and
   further comprising a bottom sheet of substantially the same size of the board for covering the back of the board as well as the elastic skin folds therein.

2. The electronic book cover of claim 1, wherein the electronic device includes a processing chip, printed circuit board, a replaceable battery and/or a solar battery all mounted on the rigid mount.

3. The electronic hook cover of claim 1, wherein the supportive board and bottom sheet are provided by cardboard of different thickness.

4. The electronic hook cover of claim 1, wherein the elastic skin is made of an opaque rubber sheet.

5. The electronic hook cover of claim 1, wherein the numerical characters and symbols are formed by embossing on the elastic skin.

6. The electronic book cover of claim 1, wherein the first and second dielectric films are made of semi-rigid plastic sheets printed with conductive ink to provide circuit paths and contacts.

7. The electronic book cover of claim 1, wherein the perforated planar spacer is made of a sheet of sponge with cutouts at perforations.

8. The electronic book cover of claim 1, wherein the electronic device is a media player, which records and reproduces sound and visual information.

9. An electronic book cover comprising:
   a board for use in binding a book block having a plurality of writing sheets, the board having a face, a back, four side edges and at least one void to accommodate an active electronic device installed therein;
   the electronic device including a rigid mount fixed onto the board about the void and having a visible display through the void;
   an elastic skin for covering the face and a part of the board except the void, the skin having a keypad of key areas marked with various characters and symbols to be typed into the electronic device for processing preprogrammed functions; and
   a layered switch circuit mounted between the elastic skin and board,
   wherein the board has a face, a back, four side edges and at least one void to accommodate an electronic calculating unit installed therein; and further comprising:
   a calculating unit having a processing chip, printed circuit board and at least one power source all mounted on a rigid housing fixed onto the board about the void and having a visible display through the void;
   an elastic skin for covering the face and a part of the board except the void, the skin having a keypad of key areas marked with numerical characters and symbols to be typed into the electronic device for processing calculation functions;
   a layered switch circuit having a first dielectric film with rows and columns of checkered conductive sections facing inwardly of the book cover, a second dielectric film having a pattern of disconnected electric contacts at locations facing the conductive sections and superimposing the key areas, and a perforated planar spacer for normally isolating the first and second dielectric films but yielding to typing depressions for locally making electrical contacts at the second film by the first film and the second dielectric film also having at its opposite face a circuit pattern of electric bus communicating with the electric contacts by conductive through-holes; and
   a bottom sheet of substantially the same size of the board for covering the back of the board as well as the elastic skin folds therein.

10. The electronic calculator of claim 9, wherein the supportive board and bottom sheet are provided by cardboard of different thickness.

11. The electronic calculator of claim 9, wherein the elastic skin is made of an opaque rubber sheet.

12. The electronic calculator of claim 9, wherein the numerical characters and symbols are formed by embossing on the elastic skin.

13. The electronic calculator of claim 9, wherein the first and second dielectric films are made of semi-rigid plastic sheets printed with conductive ink to provide circuit paths and contacts.

14. The electronic calculator of claim 9, wherein the perforated planar spacer is made of a sheet of sponge with cutouts at perforations.

* * * * *